UNITED STATES PATENT OFFICE.

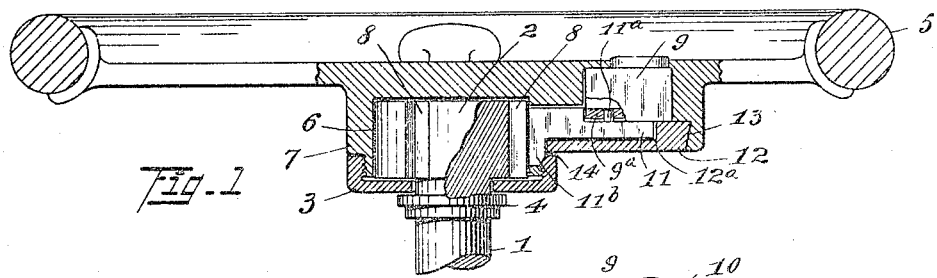
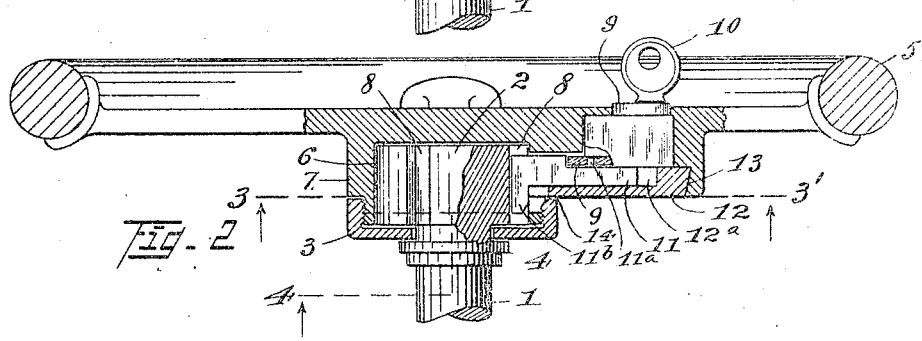
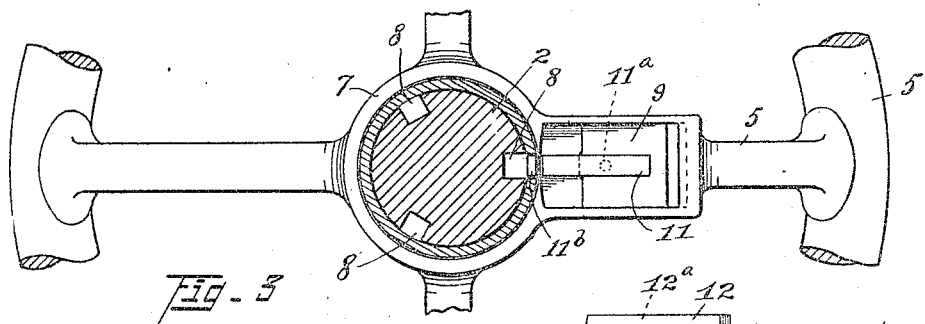
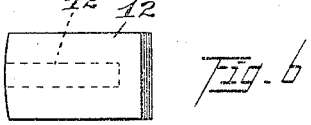
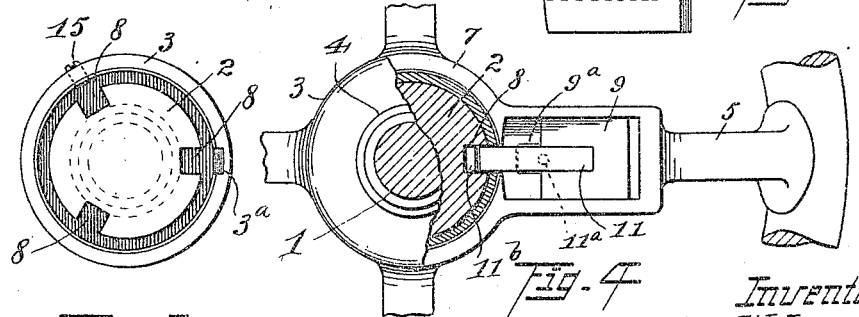

ARTHUR W. LAMP, OF CLEVELAND, OHIO, ASSIGNOR OF ONE-HALF TO C. C. MARSHALL, OF LAKEWOOD, OHIO, AND ONE-HALF TO I. S. PAYTON, OF EAST CLEVELAND, OHIO.

AUTOMOBILE-LOCK.

1,230,907.　　　　　　　Specification of Letters Patent.　　Patented June 26, 1917.

Application filed December 20, 1916. Serial No. 138,104.

*To all whom it may concern:*

Be it known that I, ARTHUR W. LAMP, a citizen of the United States, residing at Cleveland, in the county of Cuyahoga and State of Ohio, have invented a certain new and useful Improvement in Automobile-Locks, of which the following is a specification.

This invention relates to a device adapted to be attached to, or embodied in an automobile for the purpose of rendering the machine inoperative when so desired and thereby lock it, or protect it against theft or other maliciousness. Among the objects of the present invention are the provision of means for accomplishing the purpose set forth, the said means being simple, economic, and durable in construction, effective and reliable in operation, and convenient to manipulate. The realization of the above mentioned objects provides for the rendering of the machine inoperative by unlocking the hand wheel, or operating member from the steering shaft thereby making the steering mechanism inoperative. With this in view the invention consists in the construction, combination and arrangement of the parts hereinafter described and pointed out definitely in the claims.

In the accompanying drawings forming a part of this specification Figure 1 is a central vertical section through the steering wheel and its connection with the shaft, showing a portion of the shaft head in section, and free to revolve.

Fig. 2 is a similar section to that shown in Fig. 1 but showing the wheel locked to the shaft.

Fig. 3 is a section on line 3—3' of Fig. 2, and Fig. 4 is a section on line 4—3' of Fig. 2.

Fig. 5 is a top view of the steering shaft detached, and Fig. 6 is a plan view of a cover member employed.

Throughout the drawings and specification similar characters of reference are used to designate similar parts.

As the present invention has particular reference to the operating member, or steering wheel and its connection with the steering shaft of an automobile, this specification is confined to these elements, assuming that the function of the steering shaft 1 is common to all types of automobiles, and is well known.

In the embodiment of the invention as illustrated, the steering shaft 1 is provided with a head 2, and an internally threaded collar 3. The collar 3 is loosely mounted on the shaft and confined between the head 2 and an annular shoulder provided by the member 4 which may be riveted, shrunk, or otherwise permanently connected with the shaft, this being a matter of common shop practice or well known mechanical skill.

The steering wheel 5 is provided with a housing for the elements that coöperate with the steering shaft to carry out the required functions. This housing is preferably an integral part of the wheel spider, and provides an annular chamber 6 adapted to inclose the head 2, the collar 3 being threaded on to the member 7 which forms the chamber. The collar 3 thus becomes a part of the housing, and it will be seen that if there is no obstruction, the wheel is free to revolve on the shaft, having a bearing on the shoulder formed by the member 4.

The head 2 is provided with one or more longitudinal grooves or key-ways 8, the purpose of which will be clearly brought out further on.

A lock 9 of any well known construction that provides a sliding member 9ª, adapted to be operated with a removable key 10, is attached to the wheel spider. As the particular construction of the lock 9 forms no part of the present invention, it is not shown or described in detail, but the connection of the lock and its co-action and combination with the other elements of the device will now be explained.

Mounted in a suitable slide-way in the housing, below the lock 9 is a bar or bolt 11. This bolt is adapted to a sliding motion in a direction at right angles to the key-ways 8 and is actuated by the lock member 9ª, being connected therewith by a pin 11ª. The bolt 11 is provided with an extended head 11ᵇ which is adapted to engage one of the key-ways 8, and when so engaged lock the wheel to the steering shaft 1.

To facilitate the assembling of the device and to make it difficult to be tampered with, a cover plate 12 is employed. The said cover plate provides the slide-way 12ª for the bolt member 11, and in the embodiment as shown the said plate is held firmly in the housing by the inclined bearing shown at 13, and by the collar 3 bearing on said cover plate as shown at 14.

It will be seen that when the bolt 11 is withdrawn free from the key-way 8 by the action of the lock member 9ᵃ actuated by the key 10, that the head 11ᵇ will engage the recess 3ᵃ provided in the collar 3 and thereby lock said collar to the member 7. A set screw 15 is provided for positioning the recess 3ᵃ relative to any one of the key-ways 8.

From the foregoing description it will readily be understood that with the bolt 11 thrown into engagement with one of the key-ways 8 the hand wheel 5, or operating member is locked to the steering shaft 1 thereby making operative the guiding mechanism of the automobile. When it is desired to leave the car without an attendant, or to prevent the theft of the car, the bolt 11 is withdrawn by means of the lock 9 and key 10, thereby rendering inoperative the said guiding mechanism, which naturally puts the car out of commission, the key of course being withdrawn from the lock.

It is also clear that the improved device is tamper proof without the aid of the key, as in assembling, the lock 9 and bolt 11 are first placed in their proper positions with the head 11ᵇ of the bolt in the key-way 8, the cover plate 12 is next inserted and the collar 3 threaded onto the member 7. When thus assembled the steering mechanism is in operative condition, and must be in this condition to be disassembled, for the reason that when the mechanism is inoperative by the withdrawal of the bolt 11, the collar 3 is locked, or cannot be unscrewed or disconnected from the member 7 without the aid of the key 10 for disengaging the bolt head from the recess 3ᵃ.

This improvement when embodied in an automobile hinders or prevents the theft of the car, owing to the fact that with the steering mechanism inoperative the car as a whole is practically inoperative.

While I have shown and described a practical embodiment of my improvement, it will be understood that in practice there may be numerous deviations in the details of construction of the device without departure from the nature of the invention, and that the limitations are governed only by the scope of the claims.

What I claim and desire to secure by Letters Patent is:

1. An automobile lock comprising the combination of the steering shaft; a head on said shaft; an operating member provided with a chamber in which the head of the steering shaft is mounted; a collar loosely mounted on the shaft under the head thereof and threaded onto the operating member; a longitudinal key-way in the head of the steering shaft; a lock and bolt housing on the operating member; a slidable bolt mounted in said housing and adapted for engagement and disengagement with the key-way in the steering head; a closure member for the bolt housing, said closure member being locked to the housing by the threaded collar.

2. An automobile lock comprising the combination of the steering shaft; a head on said shaft; an operating member provided with a chamber in which the head of the steering shaft is mounted; a collar loosely mounted on the shaft under the head thereof and threaded onto the operating member; a longitudinal key-way in the head of the steering shaft; a lock and bolt housing on the operating member; a slidable bolt mounted in said housing and adapted for engagement and disengagement with the key-way in the steering head; a closure member for the bolt housing, said closure member being locked to the housing by the threaded collar; and a recess in the thread of the collar member for engagement with the bolt when said bolt is disengaged from the key-way on the steering head.

3. In an automobile lock the combination of the steering shaft; a head on said shaft; an operating member provided with a chamber in which the head of the steering shaft is mounted; a shoulder on the steering shaft; a collar loosely mounted on the shaft and bearing on said shoulder and confined between said shoulder and the head of the shaft, said collar having a threaded connection with the operating member; a recess in the thread of said collar; longitudinal key-ways in the head of the steering shaft; a slidable bolt mounted on the operating member and adapted for engagement and disengagement with one of the key-ways and for engagement and disengagement in the recess in the collar; lock mechanism for operating said bolt; and a removable key for actuating said lock.

4. An automobile lock comprising the combination of the steering shaft; a head on said shaft; an operating member provided with a chamber in which the head of the steering shaft is mounted; a collar loosely mounted on the shaft under the head thereof and threaded onto the operating member; a longitudinal key-way in the head of the steering shaft; a slidable bolt mounted on the operating member and adapted for engagement and disengagement with the key-way in the steering head; a recess in the collar member cut through the thread thereof for engagement with the slidable bolt when said bolt is disengaged from the key-way, and thereby prevent the turning of the collar in its threaded connection with the operating member; and means for operating said bolt.

5. An automobile lock comprising the combination of the steering shaft; a head on said shaft; an operating member provided with a chamber in which the head of the steering shaft is mounted; a collar loosely mounted on the shaft under the head thereof and threaded onto the operating member; a longitudinal key-way in the head of the steering shaft; a lock and bolt housing on the operating member; a slidable bolt mounted in said housing and adapted for engagement and disengagement with the key-way in the steering head; a closure member for the bolt housing, said closure member being locked to the housing by the threaded collar; a recess in the collar member for engagement with the slidable bolt when said bolt is disengaged from the key-way, and thereby prevent the turning of the collar in its threaded connection with the operating member; lock mechanism attached to the operating member within the housing and having operative connection with the slidable bolt member; and a removable key for operating the slidable bolt through the medium of the lock mechanism.

ARTHUR W. LAMP.